United States Patent
Alzahrani

(10) Patent No.: US 11,233,727 B1
(45) Date of Patent: Jan. 25, 2022

(54) SYSTEM AND METHOD FOR SECURING SDN BASED SOURCE ROUTING

(71) Applicant: King Abdulaziz University, Jeddah (SA)

(72) Inventor: Bander Alzahrani, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/458,694

(22) Filed: Aug. 27, 2021

(51) Int. Cl.
| | |
|---|---|
| *H04L 12/50* | (2006.01) |
| *H04L 12/707* | (2013.01) |
| *H04L 12/721* | (2013.01) |
| *H04L 9/08* | (2006.01) |
| *H04L 12/751* | (2013.01) |
| *H04L 12/717* | (2013.01) |

(52) U.S. Cl.
CPC .............. *H04L 45/24* (2013.01); *H04L 9/085* (2013.01); *H04L 9/0825* (2013.01); *H04L 45/02* (2013.01); *H04L 45/38* (2013.01); *H04L 45/42* (2013.01)

(58) Field of Classification Search
CPC ...................................................... H04L 12/50
USPC ......................................................... 370/400
See application file for complete search history.

(56) References Cited

U.S. PATENT DOCUMENTS

| | | | |
|---|---|---|---|
| 5,276,735 A | 1/1994 | Boebert et al. | |
| 5,502,766 A | 3/1996 | Boebert et al. | |
| 8,135,134 B2 | 3/2012 | Orsini et al. | |
| 8,171,531 B2 | 5/2012 | Buer | |
| 9,455,979 B2 | 9/2016 | Blanke | |
| 10,193,692 B2 | 1/2019 | Liao et al. | |

(Continued)

FOREIGN PATENT DOCUMENTS

| | | |
|---|---|---|
| CN | 108551447 B | 5/2020 |
| EP | 3 175 578 B1 | 9/2019 |

(Continued)

OTHER PUBLICATIONS

Zhaogang Shu, et al., "Traffic Engineering in Software-Defined Networking: Measurement and Management", IEEE Access, Special Section on Green Communications and Networking for 5G Wireless, vol. 4, 2016, pp. 3246-3256.

(Continued)

*Primary Examiner* — Dang T Ton
(74) *Attorney, Agent, or Firm* — Oblon, McClelland, Maier & Neustadt, L.L.P.

(57) ABSTRACT

A mobile device network that routes packets includes programmable switch devices that dynamically make packet switching decisions for routing the packets, a network controller for configuring the switch devices, a sender device connected in the network, and a receiver device connected in the network. The sender device and the receiver device can each be a mobile device or other network appliance. The sender device selects a path including links to predefined switch devices that a packet will follow, in which the packet contains an authenticator. Every predefined switch device that forwards the packet performs a computation that alters the authenticator based on an identity-based encryption algorithm, and the receiver device verifies that the packet was forwarded through the selected path based on a final value of the authenticator resulting from the computation performed by a last switch device that forwards the packet to the receiver.

20 Claims, 10 Drawing Sheets

(56) References Cited

U.S. PATENT DOCUMENTS

| | | |
|---|---|---|
| 2013/0223442 A1 | 8/2013 | Narayanan et al. |
| 2016/0337326 A1 | 11/2016 | O'Hare et al. |
| 2017/0295100 A1* | 10/2017 | Hira ................ H04L 47/125 |
| 2020/0267074 A1 | 8/2020 | Wang et al. |
| 2020/0322312 A1 | 10/2020 | Psenak et al. |

FOREIGN PATENT DOCUMENTS

| | | |
|---|---|---|
| EP | 3 499 970 B1 | 7/2020 |
| WO | WO 2014/146259 A1 | 9/2014 |
| WO | WO 2017/031326 A1 | 2/2017 |
| WO | WO 2020/206112 A1 | 10/2020 |

OTHER PUBLICATIONS

Ambili K N, et al., "A Secure Software Defined Networking based Framework for IoT Networks", Journal of Information Security and Applications, Sep. 17, 2020, pp. 1-19.

Ali Alshahrani, et al., "Authentication Method in Software-Defined Network Based on Ciphertext-Policy Attributes Encryption", International Journal of Innovative Computing, Information and Control, vol. 14, No. 5, Oct. 2018, pp. 1947-1957.

Seongmin Kim, et al., "A First Step Towards Leveraging Commodity Trusted Execution Environments for Network Applications", Proceedings of the 14th ACM Workshop on Hot Topics in Networks, 2015, 7 pages.

Jad Naous, et al., "Verifying and enforcing network paths with Icing", Proceedings of the Seventh Conference on Emerging Networking Experiments and Technologies, Dec. 2011, 12 pages.

Barath Raghavan, et al., "A System for Authenticated Policy-Compliant Routing", ACM SIGCOMM '04: Proceedings of the 2004 Conference on Applications, Technologies, Architectures, and Protocols for Computer Communications, Aug. 30, 2004, pp. 167-178.

Barath Raghavan, et al., "Secure and Policy-Compliant Source Routing", IEEE/ACM Transactions on Networking, vol. 17, Issue 3, Jun. 2009, pp. 764-777.

Tao Wang, et al., "SGuard: A Lightweight SDN Safe-Guard Architecture for DoS Attacks", China Communications, vol. 14, issue 6, Jun. 2017, pp. 113-125.

Takayuki Sasaki, et al., "SDNsec: Forwarding Accountability for the SDN Data Plane", IEEE 25th International Conference on Computer Communication and Networks (ICCCN), May 15, 2016, pp. 1-14.

Dave Levin, et al., "Alibi Routing", ACM SIGCOMM '15: Proceedings of the 2015 ACM Conference on Special Interest Group on Data Communication, Computer Communication Review, Aug. 17, 2015, pp. 611-624.

* cited by examiner

SYSTEM AND METHOD FOR SECURING SDN BASED SOURCE ROUTING

STATEMENT OF ACKNOWLEDGEMENT

The inventors extend their appreciation to the Deputyship for Research and Innovation, Ministry of Education in Saudi Arabia for funding this research work through the project number 2021-016 and King Abdulaziz University, DSR, Jeddah, Saudi Arabia.

TECHNICAL FIELD

The present disclosure generally relates to a mobile device network and corresponding method that routes packets. In particular, the present disclosure relates to source routing of packets using cryptographic authenticators. The source routing may be applied to networks including 5G, vehicular and Internet of Things (IoT).

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Software-defined networking (SDN) is a networking paradigm that is being widely used by industry. For example, intra-domain Traffic Engineering (TE) can utilize SDN. SDN supports programmable switch devices that may dynamically make packet switching decisions and perform modifications to forwarded network packets. The switch devices may act autonomously based on pre-configured forwarding rules or by interacting with a centralized entity known as SDN controller. In an example, the SDN controller may be responsible for configuring switch devices and assisting the switch devices in making forwarding decisions.

SDN may facilitate in deployment of custom routing protocols, such as source routing protocols. In source routing protocols, a sender device may select a path including multiple links to a set of switch devices in a network that a packet should follow. The path selection process is based on arbitrary criteria, e.g., security constrains, quality of service enhancement, network cache population, and many others. Nevertheless, in most cases sender devices trust programmable switches to make the appropriate switching decisions so that the path decision is respected, and the selected path is eventually used.

Legnet et al. propose "EPIC," a path authentication protocol designed for interdomain paths. See Legner, M., Klenze, T., Wyss, M., Sprenger, C. and Perrig, A., 2020. EPIC: Every Packet Is Checked in the Data Plane of a Path-Aware Internet. In 29th {USENIX} Security Symposium ({USENIX} Security 20) (pp. 541-558), incorporated herein by reference in its entirety. Paths in Legnet et al. are at the AS level, and the corresponding authenticators are based on symmetric key encryption. EPIC requires additional protocols for senders and receivers to learn the corresponding symmetric keys. Similarly, Kim et al. propose a path validation algorithm based on HMACs. See Kim, T. H. J., Basescu, C., Jia, L., Lee, S. B., Hu, Y. C. and Perrig, A., 2014, August. Lightweight source authentication and path validation. In Proceedings of the 2014 ACM conference on SIGCOMM (pp. 271-282), herein incorporated by reference in its entirety. The solution in Kim et al. can be applied both at AS-level, as well as at the router level and it requires a trusted entity to generate certificates for each verifying entity. All certificates should be known to both senders and receivers. ICING is another solution. See Naous, J., Walfish, M., Nicolosi, A., Mazieres, D., Miller, M. and Seehra, A., 2011, December. Verifying and enforcing network paths with ICING. In Proceedings of the Seventh COnference on emerging Networking EXperiments and Technologies (pp. 1-12), herein incorporated by reference in its entirety. ICING utilizes self-generated public keys for generating Proofs ofProvenance. However, ICING requires proving entities to share these keys with their direct connections, as well as a special purpose server per node, referred to as the Consent Server. Raghavan and Snoeren propose a solution for secure source routing. See Raghavan, B. and Snoeren, A. C., 2004. A system for authenticated policy-compliant routing. ACM SIGCOMM Computer Communication Review, 34(4), pp. 167-178, herein incorporated by reference in its entirety. However, the assumptions of Raghavan and Snoeren are different from those of our solution: the solution in senders are considered untrusted and the network seeks to protect itself from malicious senders. To this end, the authors of Raghavan and Snoeren [2004] propose a solution that allows senders to include in their packets a proof that shows that they are "authorized" to send a packet from this path. Platypous is an evolution of Raghavan and Snoeren which similarly allows senders to include a stamp that indicates that a sender is "policy compliant." See Raghavan, B., Verkaik, P. and Snoeren, A. C., 2008. Secure and policy-compliant source routing. IEEE/ACM Transactions On Networking, 17(3), pp. 764-777, herein incorporated by reference in its entirety. Other related works try to achieve similar foals by leveraging "Trusted Execution Environment" (TEE). TEE are hardware modules that are cryptographically guaranteed to execute a particular piece of code as expected. For example Kim et al, leverages Intel's SGX to implement secure routing protocols. See Kim, S., Shin, Y., Ha, J., Kim, T. and Han, D., 2015, November. A first step towards leveraging commodity trusted execution environments for network applications. In Proceedings of the 14th ACM Workshop on Hot Topics in Networks (pp. 1-7), herein incorporated by reference in its entirety. Wang et al. are implementing a technique with similar goals with our solution. See Wang, T. and Chen, H., 2017. SGuard: A lightweight SDN safe-guard architecture for DoS attacks. China Communications, 14(6), pp. 113-125, incorporated herein by reference in its entirety. The solution in Wang et al. targets to secure SDN architecture by marking network flows and by detecting malicious ones. Sasaki et al. are also trying to secure SDN architectures by leveraging cryptographic proofs. See Sasaki, T., Pappas, C., Lee, T., Hoefler, T. and Perrig, A., 2016, August. SDNsec: Forwarding accountability for the SDN data plane. In 2016 25th International Conference on Computer Communication and Networks (ICCCN) (pp. 1-10). IEEE, herein incorporated by reference in its entirety. In particular, their solution attaches to each packet a cryptographic proof that can later be used for verifying that a packet followed a correct path. Alibi routing also uses per-packet cryptographic proofs to provide secure packet routing. See Levin, D., Lee, Y., Valenta, L., Li, Z., Lai, V., Lumezanu, C., Spring, N. and Bhattacharjee, B., 2015. Alibi routing. ACM SIGCOMM Computer Communication Review, 45(4), pp. 611-624.

Traffic Engineering (TE) may utilize SDN, for example, in the measurement, and management of network traffic, and in the design of reasonable routing mechanisms to guide network traffic to improve utilization of network resources and meet requirements of the quality of service of the network.

Emerging applications such as Internet of things (IoT), edge computing and 5G require an infrastructure that can evolve. Customer requirements for these emerging applications require an infrastructure that can be configured quickly and easily. These emerging applications involve building, testing and launching new services in an automated fashion.

As an example, 5G includes a capability of network slicing, which allows a service provider to provide a dedicated slice of a virtualized network servicer to a customer. A slice may be dedicated to a single enterprise's distribution operations. 5G slices may be implemented as multiple logically independent networks that are organized by the SDN controller. In a 5G network, both the distribution of core functions to the edge and the creation and decomposition of slices can occur on demand, depending on the service policy being triggered by a given customer application.

SDN is making significant contributions to network and service automation. Still, basic capabilities that network personnel must focus on, such as high reliability, high performance, open integration, must be continuously strengthened.

For example, existing solutions for SDN based source routing of packets rely on traditional public key cryptography. This results in additional overhead of maintaining and disseminating public keys, in addition to the path identifiers.

SUMMARY

An aspect of the present disclosure relates to a mobile device network that routes packets. The network can include a plurality of programmable switch devices in the network that dynamically make packet switching decisions for routing the packets; a network controller for configuring the switch devices; a sender device in a first mobile device connected in the network; and a receiver device in a second mobile device connected in the network. The sender device selects a path including links to predefined switch devices of the plurality of switch devices in the network that a packet will follow, in which the packet contains an authenticator. Every said predefined switch device that forwards the packet performs a computation that alters the authenticator based on an identity-based encryption algorithm. The receiver device verifies that the packet was forwarded through the selected path based on a final value of the authenticator resulting from the computation performed by a last switch device that forwards the packet to the receiver.

A further aspect of the present disclosure relates to an appliance network for routing of packets. The network can include at least one stationary appliance comprising a communications device, the at least one stationary appliance connected in the network; at least one interface computer device comprising a communications device, the at least one interface computer device connected in the network; a plurality of programmable switch devices in the network that dynamically make packet switching decisions for routing the packets; a network controller for configuring the switch devices; a sender device in an interface computing device of the at least one interface computer device; and a receiver device in a stationary appliance of the at least one stationary appliance. The sender device selects a path including links to predefined switch devices of the plurality of switch devices in the network that a packet will follow, wherein the packet contains an authenticator. Every said predefined switch device that forwards the packet performs a computation that alters the authenticator based on an identity-based encryption algorithm. The receiver device verifies that the packet was forwarded through the selected path based on a final value of the authenticator resulting from the computation performed by a last switch device that forwards the packet to the receiver.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
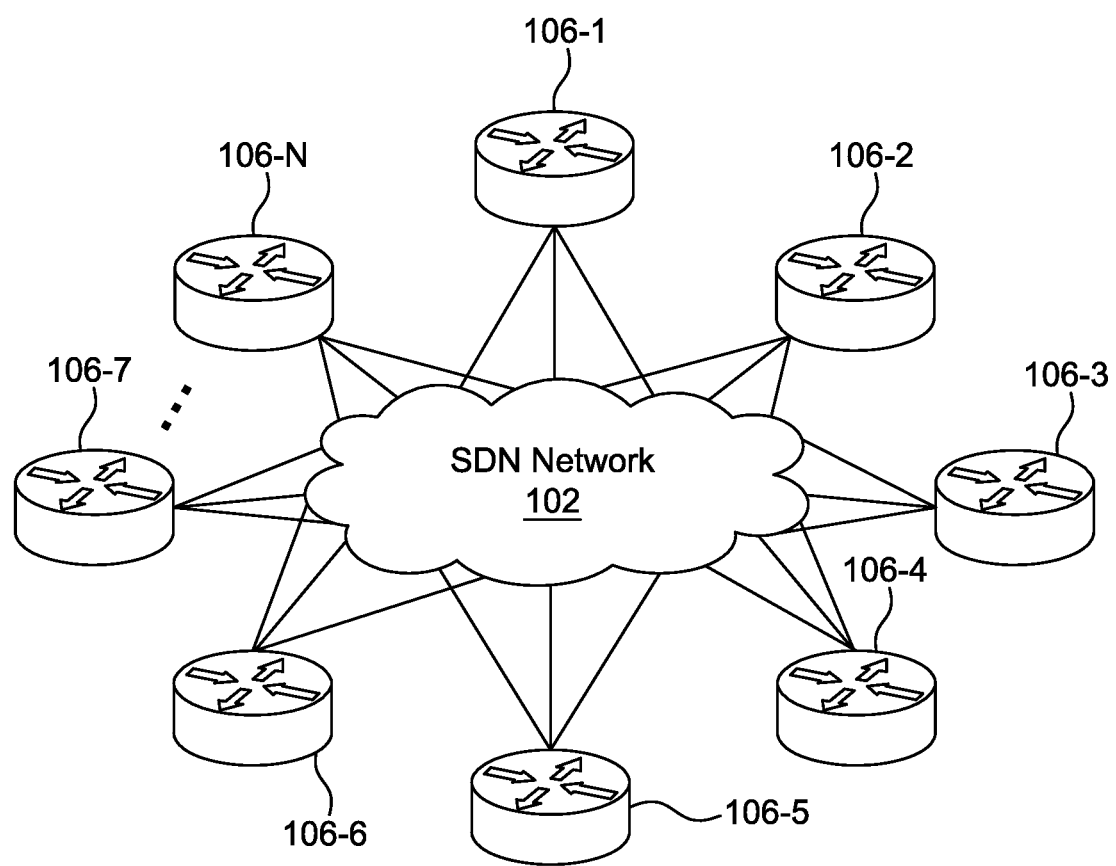
FIG. 1 is a schematic diagram of a plurality of programmable switch devices in a software-defined network (SDN) network, according to aspects of the present disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to systems and methods to implement source routing of packets over a software-defined network (SDN) in a secure manner.

FIG. 1 is a schematic diagram of a plurality of programmable switch devices 106-(1-N) in a SDN network 102, according to aspects of the present disclosure.

According to an aspect of the present disclosure, the SDN network 102 may be a network architecture that is centrally controlled or programmed using software applications. The SDN network 102 may include the plurality of programmable switch devices 106-(1-N). The plurality of programmable switch devices 106-(1-N) in the SDN network 102 may be configured to make packet switching decisions dynamically and perform modifications to forwarded packets. In an example, a packet may be a unit of data. The packet may include control information and user data.

In an aspect of the present disclosure, the plurality of programmable switch devices 106-(1-N) may act autonomously based on pre-configured forwarding rules or by interacting with a centralized trusted entity, such as a SDN controller (not shown). In the SDN network 102, there may be two types of network traffic, namely, control traffic and data traffic. The control traffic is a data flow that is transmitted between the SDN controller and the plurality of programmable switch devices 106-(1-N). The data traffic is a data flow that is transmitted between the plurality of programmable switch devices 106-(1-N). In an example, each of the plurality of programmable switch devices 106-(1-N) may be an Open vSwitch. Open vSwitch can be installed in any Linux-based workstation, as well as in smaller devices such as in Raspberry Pi based systems, and Linux-based operating systems for routers.

Figure 2:
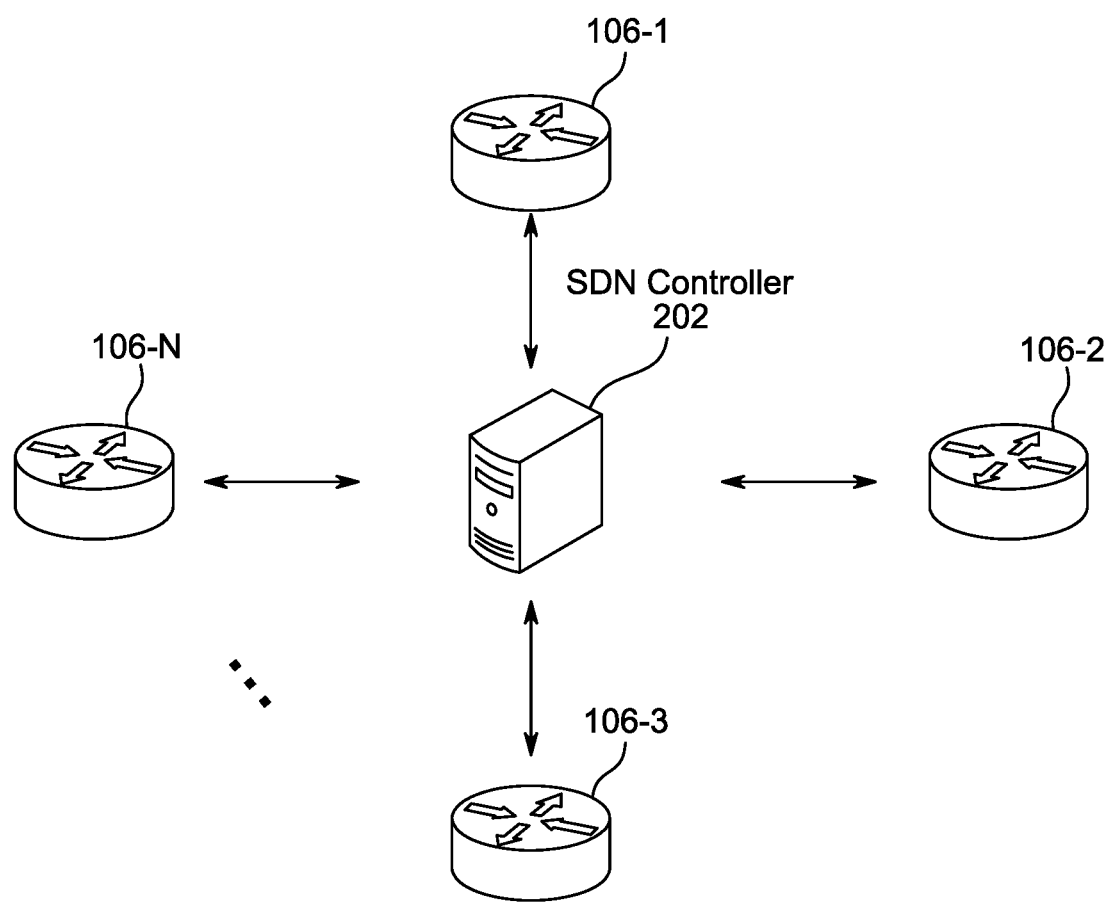
FIG. 2 is a schematic diagram of a SDN controller for configuring the plurality of switch devices, according to aspects of the present disclosure.

FIG. 2 is a schematic diagram of a SDN controller 202 for configuring the plurality of programmable switch devices 106-(1-N), according to aspects of the present disclosure.

In an aspect of the present disclosure, the SDN controller 202 may be a centralized trusted entity that may be implemented in an SDN environment. The SDN controller 202 may store the entire network information, including the network topology, dynamic changes of the network status, and global application requirements, such as QoS and security requirements.

According to an aspect of the present disclosure, the SDN controller 202 may configure the plurality of programmable switch devices 106-(1-N) and assist the plurality of programmable switch devices 106-(1-N) to make forwarding decisions related to packets. In an aspect, each of the plurality of programmable switch devices 106-(1-N) may be associated with a secret key. The SDN controller 202 may be configured to generate secret keys for the plurality of programmable switch devices 106-(1-N) based on an identity-based encryption algorithm. In an example, the identity-based encryption algorithm is a public-key encryption construction where arbitrary strings can be used as public keys.

In an aspect, the SDN controller 202 may be configured to generate a master secret key, and one or more system parameters at bootstrap. The SDN controller 202 may store the master key in a secure memory. Further, the master key is kept secret by the SDN controller 202. In an embodiment, the SDN controller 202 may generate the secret key corresponding to the given programmable switch device using the identity-based encryption algorithm. The SDN controller 202 may then securely transmit the secret key to the programmable switch device. In an embodiment, the one or more system parameters may be used as input to both encryption and decryption algorithms and are controller specific. Further, the one or more system parameters are public parameters and can be safely posted, for example, to a website, or they can be included in a network discovery protocol. According to an aspect, the plurality of programmable switch devices 106-(1-N) may learn about the one or more system parameters using an out-of-band mechanism. Further, the SDN controller 202 may always be aware of the network topology. In an embodiment, for each programmable switch device, the SDN controller 202 may determine its neighbor programmable switch devices using a topology discovery protocol.

Figure 3:
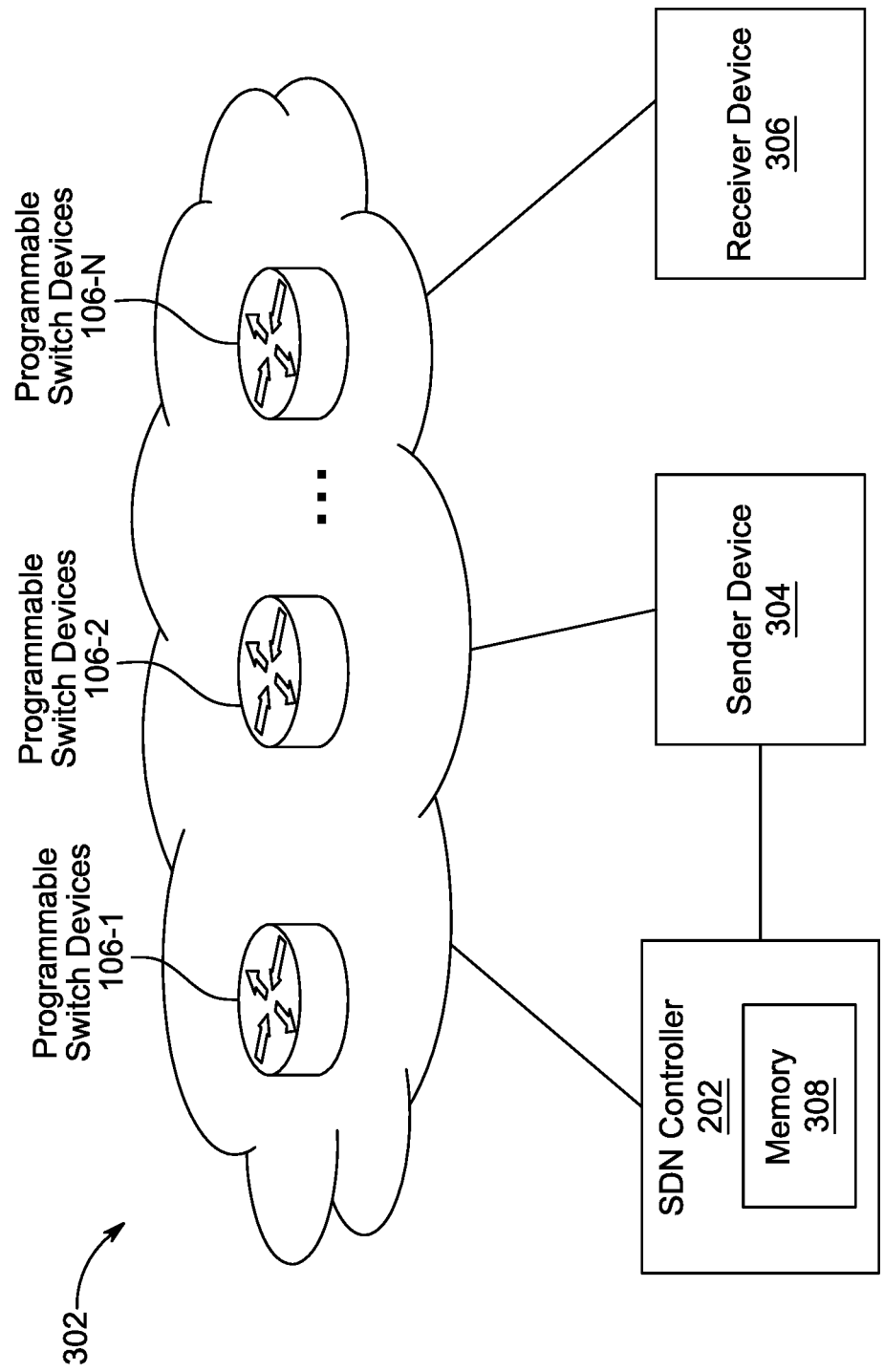
FIG. 3 is a block diagram of a communication system to implement source routing of packets over an SDN-based architecture, according to aspects of the present disclosure.

FIG. 3 is a block diagram of a communication system 302 to implement source routing of packets over an SDN-based architecture composed of unreliable nodes, according to aspects of the present disclosure. SDN-based architectures having unreliable nodes include vehicular networks, mobile ad-hoc networks, and Internet of Things (IoT). In the case of vehicular networks, IEEE 802.11p-based Dedicated Short-Range Communication may be used to form Vehicular Ad hoc Networks (VANETs). One approach has been to use 5G network to carry vehicular data between vehicles, as well as between vehicles and a base station.

In the data plane of SDN, vehicles may be equipped with onboard sensors that continuously generate numerous data such as speed, position, historical routes. Vehicles can use an on-board cellular communication module to establish links including vehicle to base station links and vehicle to vehicle links. Vehicle to base station links may be used for message transmission including the collection of vehicle information. These base station may be connected to programmable switch devices in an SDN network.

The communication system 302 may be configured to implement source routing of packets over an SDN network. In an aspect of the present disclosure, the communication system 302 may include the programmable switch devices 106-(1-N), the SDN controller 202, a sender device 304, a receiver device 306. The SDN controller 202 may further include a memory 308. The memory 308 may include any computer-readable medium known in the art including, for example, volatile memory, such as static random access memory (SRAM) and dynamic random access memory (DRAM) and/or nonvolatile memory, such as read only memory (ROM), erasable programmable ROM, flash memories, hard disks, optical disks, and magnetic tapes. The memory 308 may be capable of storing data and allowing any storage location to be directly accessed by the SDN controller 202.

The SDN network may facilitate the deployment of source routing protocols. A source routing protocol may be an application or a program that may be used for a selection of a path that a packet should follow. In an example, the path may be composed of multiple links. Each link of the path may be identified by a unidirectional identifier referred to as a link identifier (link ID). In an aspect, each link ID may be generated by the SDN controller 202. In an aspect, the sender device 304 may be connected in the SDN network and configured to select a path that a packet should follow using a source routing protocol. The sender device 304 may select the path based on desired customer policy, for example, security constraints, quality of service enhancement, and network cache population.

According to aspects of the present disclosure, the sender device 304 may be configured to select a path including one or more links to predefined programmable switch devices of the plurality of programmable switch devices 106-(1-N) in the network that a packet will follow (i.e., the packet is routed through the path selected by the sender device 304). Each link of the selected path is assigned a link ID. As described above, the SDN controller 202 may assign a link ID to each link of the selected path based on an identity-based encryption algorithm. In an aspect, whenever a programmable switch device joins an SDN network, the programmable switch device first communicates with the SDN controller 202. The SDN controller 202 may select a link identifier for each outgoing link of the programmable switch device and generate a corresponding secret key. The SDN controller 202 may then securely transmit the secret key to the programmable switch device.

In an aspect, the sender device 304 may be aware of the network topology, i.e., the links and their corresponding link IDs. As a result, the sender device 304 may be enabled to construct arbitrary packet forwarding paths. Further, the sender device 304 and the receiver device 306 may have already established an end-to-end encryption channel, for example, using a transport layer security (TLS) protocol. As a result, the confidentiality and the integrity of the transmitted data are protected. In an example, the sender device 304 may be aware of link ID of each link of the selected path. For example, the sender device 304 may be aware of the link ID of each link of the selected path as a part of the source routing protocol.

Further, the packet may include an authenticator. The authenticator may interchangeably be referred to as a cryptographic authenticator. According to an aspect, each predefined programmable switch device is configured to detect if the packet is received from a link that is not included in the selected path based on the authenticator included in the packet. In an aspect, the sender device 304 may be configured to generate the authenticator for the selected path. The manner in which the sender device 304 generates the authenticator is described below.

In an aspect, the selected path may be composed of links 1 to m. In an example, link ID of the $x^{th}$ link may be $ID_x$. Accordingly, link ID of the first link may be $ID_1$, link ID of the second link may be $ID_2$ and so forth. Further, the sender device 304 may be configured to generate a nonce (n). In an example, starting from a final link of the selected path, the sender device 304 may encrypt the nonce (n) using the link ID of the final link, then repeatedly encrypts the encrypted nonce using each preceding link back through the links of the selected path to an initial link. According to an aspect, the sender device 304 may construct the authenticator by encrypting the nonce (n) with m layers of encryption, where m is a number of links in the selected path. Further, the sender device 304 may be configured to insert the authenticator into a header of the packet.

In an embodiment, starting from link m of the selected path, the sender device 304 may encrypt the nonce (n) using the link ID of the link m based on expression (1) provided below.

$$C_m = Enc_{IDm}(n) \quad (1)$$

Similarly, the sender device 304 may encrypt the encrypted nonce (n) using each preceding link back through the links of the selected path to the initial link, i.e., link 1 based on expressions (2), (3), and (4) provided below.

$$C_{m-1} = Enc_{IDm-1}(C_m) \quad (2)$$

$$C_{m-2} = Enc_{IDm-2}(C_{m-1}) \quad (3)$$

$$C_1 = Enc_{ID1}(C_2) \quad (4)$$

In the above expression (2), $C_1$ represents the authenticator of the selected path. In an example, the authenticator is the nonce n encrypted with m layers of encryption (where m is the path length).

In an aspect of the present disclosure, the sender device 304 may include the authenticator in the packet that is to be transmitted to the receiver device 306. According to an aspect of the present disclosure, the packet is routed from the sender device 304 to the receiver device 306 through the predefined programmable switch devices. According to an aspect, each predefined programmable switch device that forwards the packet may be configured to perform a computation that alters the authenticator based on the identity-based encryption algorithm.

According to an aspect of the present disclosure, the predefined programmable switch devices may be enabled to make forwarding decisions (autonomously or with an assistance of the SDN controller 202) using link IDs of the links of the selected path. According to an aspect, each predefined programmable switch device may determine the link ID of the next link in the selected path. Based on the determination, each predefined programmable switch device may retrieve a corresponding secret key from its memory. In an aspect, each predefined programmable switch device may decrypt the authenticator using a secret key that corresponds to a link ID of a next link in the selected path. In an example, the decryption is performed for one encryption layer per each predefined programmable switch device. In an aspect, when the decryption succeeds, the respective programmable switch device may forward the packet including the altered authenticator to a next programmable switch device. Further, when the decryption fails, the packet is rejected as being in a wrong programmable switch device.

According to an aspect of the present disclosure, the receiver device 306 may receive the packet including the final authenticator which includes only the encrypted nonce. In an aspect, when the packet reaches the receiver device 306, the receiver device 306 may be configured to verify that the packet was forwarded only through the links that compose the path that the sender device 304 selected based on a final value of the authenticator. In an aspect, the receiver device 306 may be configured to decrypt the encrypted nonce and check that a nonce is the encrypted nonce in order to verify that the packet was forwarded through the selected path. In an example, if the packet is forwarded through all the predefined programmable switch devices, then the final value of the authenticator will be the nonce n. Accordingly, the receiver device 306 is not required to be aware of link IDs of the links of the path or any information related to the path, to determine that the packet was forwarded only through the links that compose the selected path.

In some aspects of the present disclosure, the sender device 304 may be configured to select a path that includes a branch to two or more branched paths for routing of packets. In such scenarios, the sender device 304 may be configured to construct a branch authenticator for each branched path and create a merged authenticator that merges the branched paths into a single link. Further, a programmable switch device at the branch is configured to split the merged authenticator into a plurality of authenticator parts, decrypt each of the authenticator parts, and forward one of the authenticator parts to the branched path in which the decryption is successful.

Figure 4:
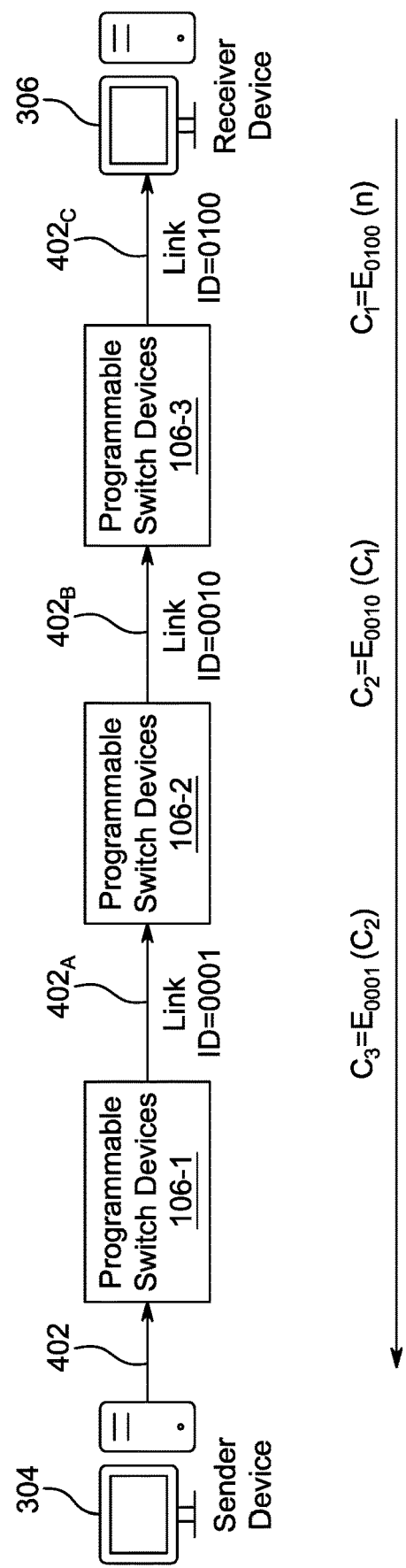
FIG. 4 is an exemplary schematic illustrating construction of an authenticator for a single path, according to aspects of the present disclosure.

FIG. 4 is an exemplary schematic illustrating construction of an authenticator for a single path 402, according to aspects of the present disclosure.

According to an aspect of the present disclosure, the sender device 304 may be configured to transmit a packet to the receiver device 306. For transmission of the packet, the sender device 304 may select the single path 402 including links to predefined programmable switch devices that the packet will follow. In an example, the single path 402 may refer to a unicast forwarding path. In the example of FIG. 4, the single path 402 includes three links, namely, link A (represented by 402$_A$), link B (represented by 402$_B$), and link C (represented by 402$_C$), and each link is assigned a link ID. In an example, link A is assigned a link ID "0001", link B is assigned a link ID "0010", and link C is assigned a link ID "0100". Further, the predefined programmable switch devices include three programmable switch devices, namely a programmable switch device 106-1, a programmable switch device 106-2, and a programmable switch device 106-3. In an aspect, for each outgoing link, each programmable switch device is configured with a corresponding secret key ($SK_{linkID}$). For example, in FIG. 4, the programmable switch device 106-1 is configured with a secret key "$SK_{0001}$", the programmable switch device 106-2 is configured with a secret key "$SK_{0010}$", and the programmable switch device 106-3 is configured with a secret key "$SK_{0100}$".

According to an aspect of the present disclosure, the sender device 304 may be configured to express the single path 402 that the packet must follow using an authenticator. In an example, the authenticator may be inserted in the packet. In an aspect, the authenticator may allow the programmable switch devices 106-(1-3) to detect if the packet is received from a link not included in the single path 402. The authenticator may also facilitate the receiver device 306 to verify that the packet was forwarded through the single path 402.

The sender device 304 may be configured to construct the authenticator for the single path 402 composed of link A, link B, and link C. Initially, the sender device 304 may generate a nonce n. In an aspect of the present disclosure, the sender device 304 may perform a backward calculation for the selected path 402 to construct the authenticator. In the backward calculation, the sender device 304 may first perform an encryption on the nonce n and then work backwards through the selected path 402 to perform layers of encryption. Thus, the sender device 304 performs a backward calculation to create a layered authenticator before sending the packet. The layered authenticator is decrypted layer-by-layer by the programmable switch device 106-1, the programmable switch device 106-2, and the programmable switch device 106-3 as it is passes through the selected path 402.

According to an aspect of the present disclosure, starting from the link 402$_A$, the sender device 304 may generate $C_1=E_{0100}(n)$ based on the expression (1). Further, for the link 402$_B$, the sender device 304 may generate $C_2=E_{0010}(C_1)$ based on the expression (2). For the link 402$_A$, the sender device 304 may generate $C_3=E_{0001}(C_2)$ based on the expression (4). The $C_3$ is the authenticator for the single path 402.

Although, it has been described that the communication system 302 includes a single receiver device (i.e., the receiver device 306), in some aspects of the present disclosure, the communication system 302 may include more than one receiver device. Further, it has been described that the sender device 304 selects a single path (i.e., a unicast forwarded path) for routing of packets, in some aspects of the present disclosure, the sender device 304 may select more than one path for routing of packets. In an example, the sender device 304 may select a path that includes a branch to two or more branched paths, where each branch path may lead to a different receiver device.

Figure 5:
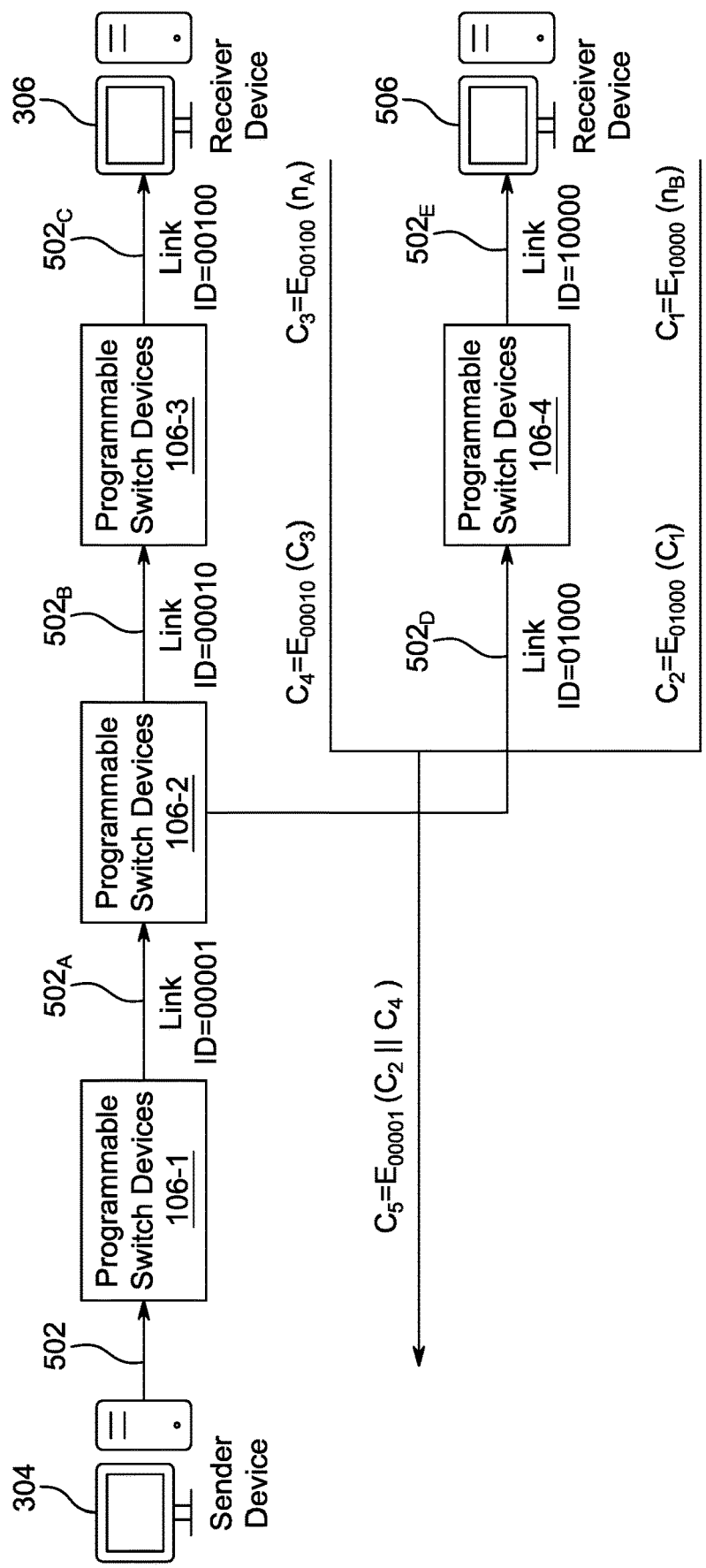
FIG. 5 is an exemplary schematic illustrating construction of an authenticator for a multicast path, according to aspects of the present disclosure.

FIG. 5 is an exemplary schematic illustrating construction of an authenticator for a multicast path 502, according to aspects of the present disclosure.

According to an aspect of the present disclosure, the sender device 304 may be configured to transmit a packet to the receiver device 306 and a receiver device 506. For transmission of the packet, the sender device 304 may select the multicast path 502 including links to predefined programmable switch devices that the packet will follow. In an example, the multicast path 502 may include a branch to two branched paths.

In the example of FIG. 5, the multicast path 502 includes two branch paths and five links, namely, link A (represented by 502$_A$), link B (represented by 502$_B$), link C (represented by 502$_C$), link D (represented by 502$_D$), and link E (represented by 502$_E$), and each link is assigned a link ID. In an example, link A is assigned a link ID "00001", link B is assigned a link ID "00010", link C is assigned a link ID "00100", link D is assigned a link ID "01000", and link E is assigned a link ID "10000". Further, the predefined programmable switch devices include four programmable switch devices, namely a programmable switch device 106-1, a programmable switch device 106-2, a programmable switch device 106-3, and a programmable switch device 106-4.

According to an aspect of the present disclosure, the sender device 304 may be configured to express the multicast path 502 that the packet must follow using an authenticator. In an example, the authenticator may be inserted in the packet. The sender device 304 may be configured to construct a branch authenticator for each branched path of the multicast path 502.

In the example of FIG. 5, the sender device 304 may be configured to construct an authenticator for each branch, i.e., $C_2$ and $C_4$. At the programmable switch device 106-2, the two branched paths are merged into a single link with link ID "00001". Accordingly, the sender device 304 may create a merged authenticator which is the identity-based encryption of the concatenation of the corresponding branch authenticators. As described in FIG. 5, the sender device 304 constructs a merged authenticator $C_5=E_{00001}(C_2\|C_4)$, where $\|$ denotes concatenation.

According to an aspect of the present disclosure, following the backward calculation, if the packet is forwarded correctly, then when the packet reaches the programmable switch device 106-2, the authenticator will be of the form $C_2\|C_4$. The programmable switch device 106-2 may split the merged authenticator (i.e., $C_5$) into two authenticator parts (i.e., $C_2$ and $C_4$). Further, the programmable switch device 106-2 may decrypt each of the authenticator parts with the secret key that corresponds to each next hop link, and if the decryption process is successful, the programmable switch device 106-2 forwards the corresponding authenticator to the appropriate branch. As can be seen in FIG. 5, the sender device 304 uses different nonce for each receiver device. In an example, the sender device 304 uses nonce $n_A$ for the receiver device 306 and nonce $n_B$ for the receiver device 506.

Figure 6:
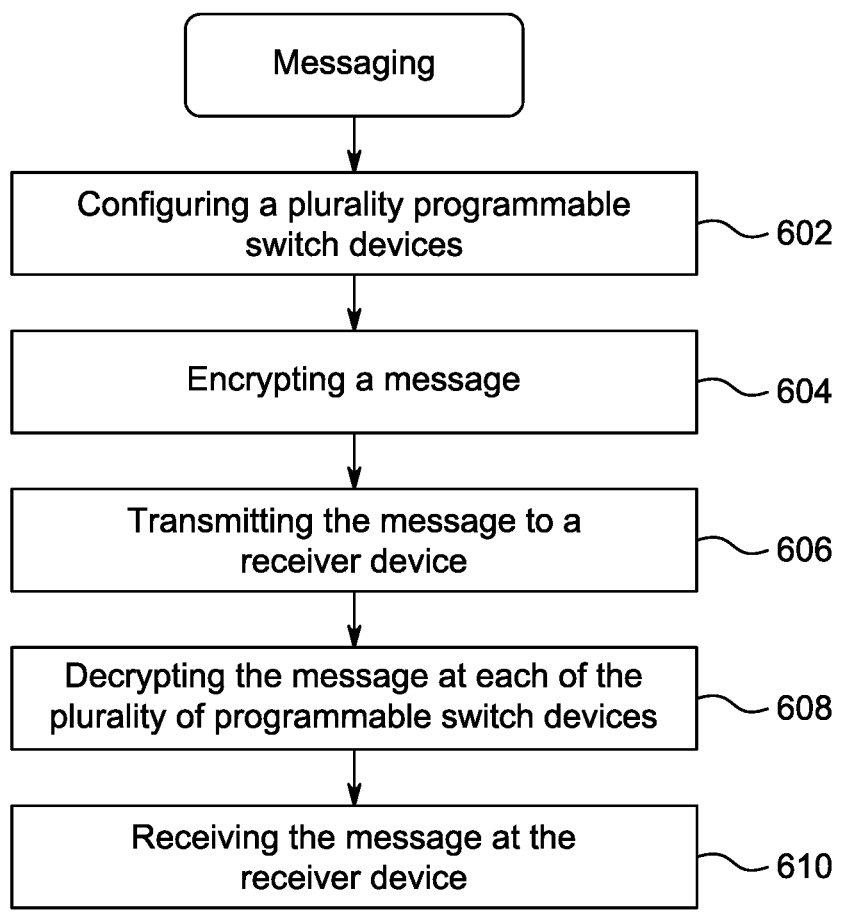
FIG. 6 is an exemplary flowchart of messaging in an SDN, according to aspects of the present disclosure.

FIG. 6 is an exemplary flowchart 600 of messaging in an SDN, according to aspects of the present disclosure.

Step 602 of the flowchart 600 includes configuring the plurality of programmable switch devices 106-(1-N). In an aspect of the present disclosure, the SDN controller 202 configures the plurality of programmable switch devices 106-(1-N).

Step 604 of the flowchart 600 includes encrypting a message. In an aspect of the present disclosure, the sender device 304 may be configured to encrypt a message that is required to be transmitted to the receiver device 306. In an example, the message may include an authenticator.

Step 606 of the flowchart 600 includes transmitting the message to the receiver device 306. In an aspect of the present disclosure, the sender device 304 may be configured to transmit the message to the receiver device 306. In an example, the message is routed to the receiver device 306 through the plurality of programmable switch devices 106-(1-N) via a path selected by sender device 304.

Step 608 of the flowchart 600 includes decrypting the message at each of the plurality of programmable switch devices 106-(1-N). In an aspect, each of the plurality of programmable switch devices 106-(1-N) may decrypt the authenticator using a secret key that corresponds to a link ID of a next link in the selected path. In an aspect, when the decryption succeeds, the respective programmable switch device may forward the packet including the altered authenticator to a next programmable switch device.

Step 610 of the flowchart 600 includes receiving the message at the receiver device 306. The receiver device 306 may receive the packet including the final authenticator.

Figure 7:
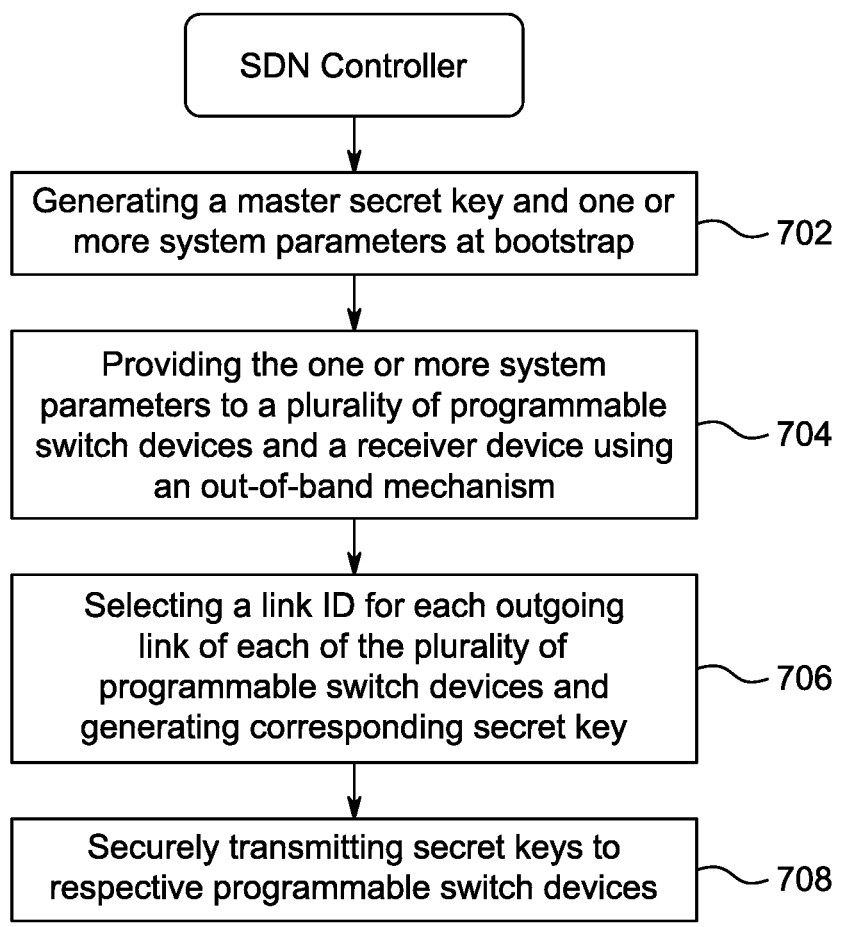
FIG. 7 is an exemplary flowchart of switch configuration by a SDN controller, according to aspects of the present disclosure.

FIG. 7 is an exemplary flowchart 700 of switch configuration by the SDN controller 202, according to aspects of the present disclosure.

Step 702 of the flowchart 700 includes generating a master secret key and one or more system parameters at bootstrap. According to an aspect of the present disclosure, the SDN controller 202 may be configured to generate the master secret key and the one or more system parameters at bootstrap. In an aspect, the SDN controller 202 may use the master key and at least one system parameter to generate a secret key corresponding to a given programmable switch device.

Step 704 of the flowchart 700 includes providing the one or more system parameters to the plurality of programmable switch devices 106-(1-N) and the receiver device 306 using an out-of-band mechanism. In an aspect of the present disclosure, the SDN controller 202 may be configured to provide the one or more system parameters to the plurality of programmable switch devices 106-(1-N) and the receiver device 306 using the out-of-band mechanism.

Step 706 of the flowchart 700 includes selecting a link ID for each outgoing link of each of the plurality of programmable switch devices 106-(1-N) and generating a corresponding secret key. According to an aspect of the present disclosure, the SDN controller 202 may be configured to select the link ID for each outgoing link of each of the plurality of programmable switch devices 106-(1-N) and generate a corresponding secret key.

Step 708 of the flowchart 700 includes securely transmitting secret keys to respective programmable switch devices 106-(1-N). According to an aspect, the SDN controller 202 may be configured to securely transmit the secret keys to respective programmable switch devices 106-(1-N).

Figure 8:
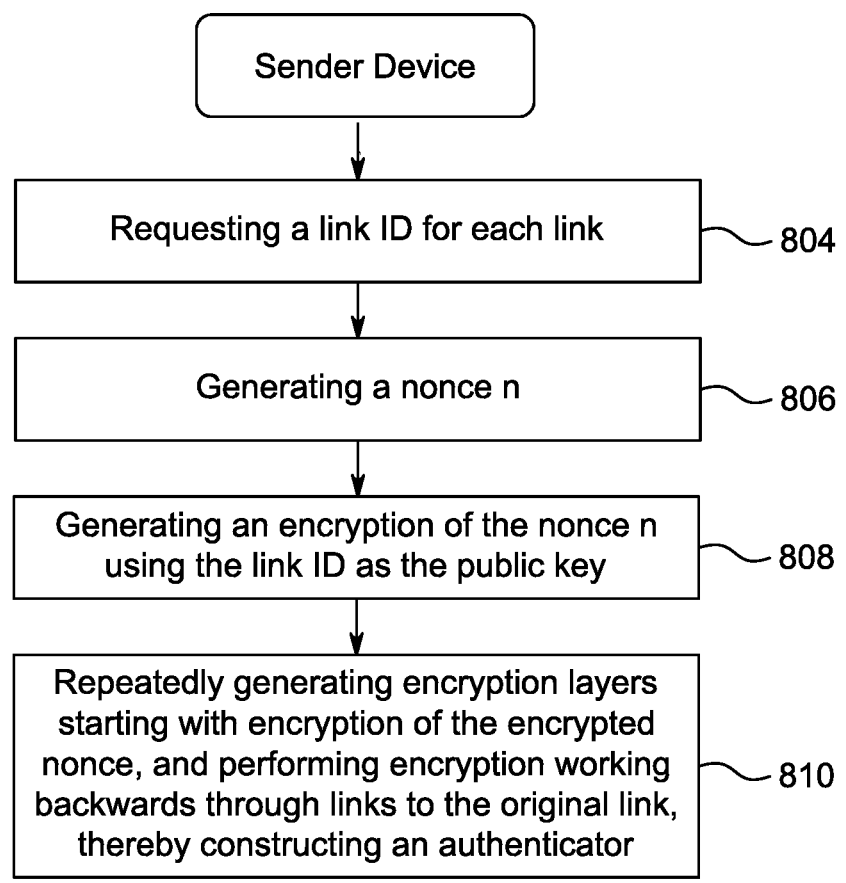
FIG. 8 is an exemplary flowchart of construction of an authenticator by a sender device, according to aspects of the present disclosure.

FIG. 8 is an exemplary flowchart 800 of a construction of an authenticator by the sender device 304, according to aspects of the present disclosure.

Step 804 of the flowchart 800 includes requesting a link ID for each link. According to an aspect of the present disclosure, the sender device 304 may be configured to request the link ID for each link from the SDN controller 202.

Step 806 of the flowchart 800 includes generating a nonce n. According to an aspect of the present disclosure, the sender device 304 may be configured to go generate a random nonce n.

Step 808 of the flowchart 800 includes generating an encryption of the nonce n using the link ID as the public key. In an aspect of the present disclosure, the sender device 304 may be configured to generate the encryption of the nonce n using the link ID as the public key.

Step 810 of the flowchart 800 includes repeatedly generating encryption layers starting with encryption of the encrypted nonce, and performing encryption working backwards through links to the original link, thereby constructing an authenticator. In an aspect of the present disclosure, the sender device 304 may be configured to construct the authenticator for the selected path.

Figure 9:
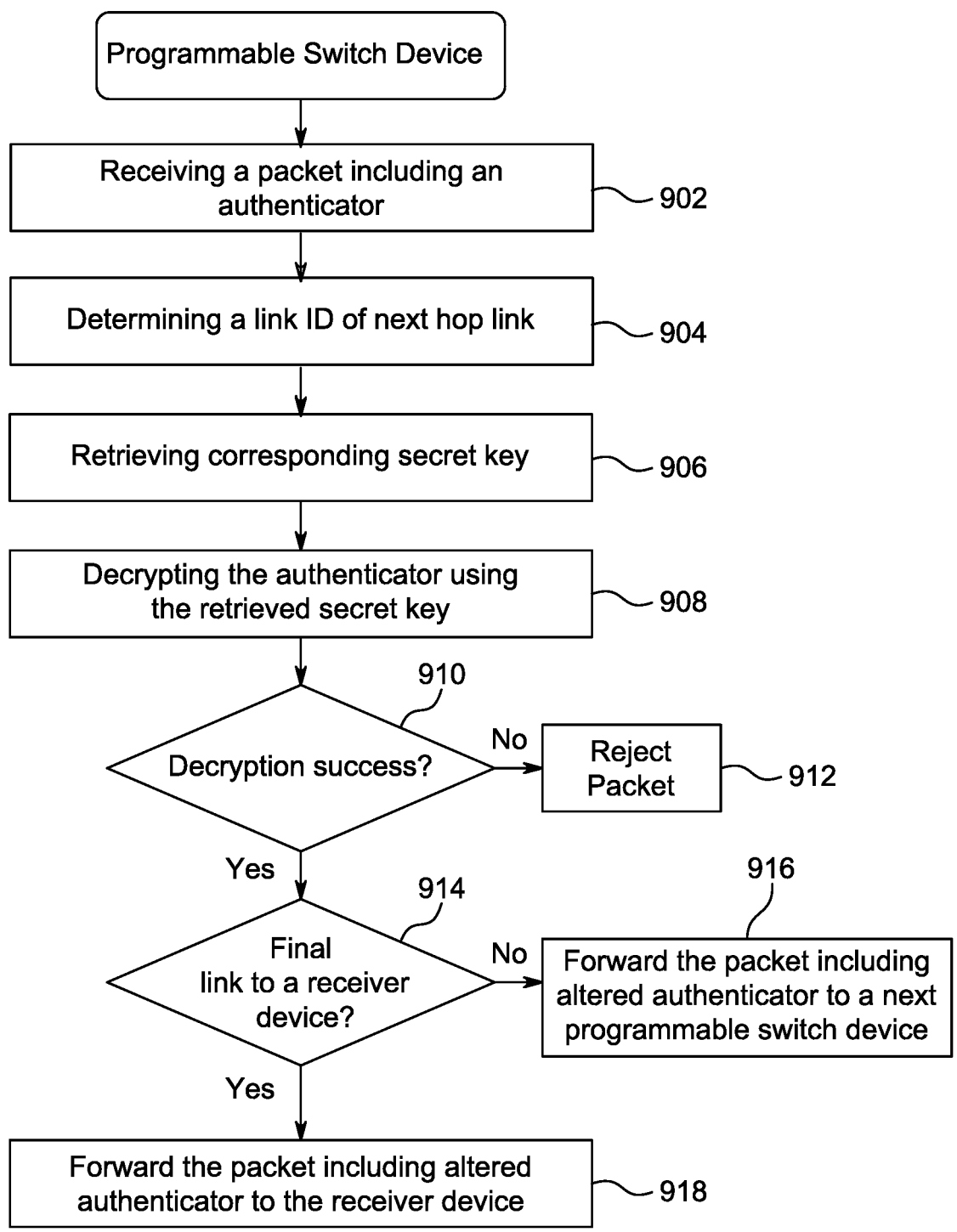
FIG. 9 is an exemplary flowchart of forwarding a packet by a programmable switch device, according to aspects of the present disclosure.

FIG. 9 is an exemplary flowchart 900 of forwarding a packet by a programmable switch device, according to aspects of the present disclosure.

Step 902 of the flowchart 900 includes receiving a packet including an authenticator. In an aspect of the present disclosure, the programmable switch device may be configured to receive the packet including the authenticator from the sender device 304.

Step 904 of the flowchart 900 includes determining a link ID of next hop link. In an aspect of the present disclosure, a programmable switch device may be configured to determine a link ID of next hop link.

Step 906 of the flowchart 900 includes retrieving corresponding secret key. In an aspect of the present disclosure, the programmable switch device may be configured to retrieve the corresponding secret key. In an example, the programmable switch device may retrieve the corresponding secret key from the SDN controller 202. In another example, the programmable switch device may retrieve the corresponding secret key from its memory.

Step 908 of the flowchart 900 includes decrypting the authenticator using the retrieved secret key. According to an aspect of the present disclosure, the programmable switch device may decrypt the authenticator using the retrieved secret key. Step 910 of flowchart 900 includes determining whether the decryption was a success. When the decryption fails, the flowchart proceeds to step 912 ("No" branch) and when the decryption succeeds, the flowchart proceeds to step 914 ("Yes" branch).

Step 912 of the flowchart 900 includes rejecting, by the programmable switch device, the packet as being in a wrong programmable switch device. Step 910 of the flowchart 900 includes determining if the next hop link is the final link to the receiver device 306. If the next hop link is the final link, then the flowchart proceeds to step 916 ("No" branch), and if the next hop link is not the final link, then the flowchart proceeds to step 918. Step 916 of the flowchart 900 includes forwarding by the programmable switch device, the packet including the altered authenticator to next programmable switch device. Step 918 of the flowchart 900 includes forwarding by the programmable switch device, the packet including the altered authenticator to the receiver device 306.

According to aspects of the present disclosure, the communication system 302 can be implemented in a variety of platforms with tolerable overhead. Further, the sender device 304 can generate a path authenticator using information provided by the underlay source routing protocol. The size of the path authenticator generated by the sender device 304 of the present disclosure may be substantially small in comparison to a path authenticator generated by conventional systems.

Furthermore, by using the identity-based encryption algorithm, link identifiers can be used as an encryption key. Therefore, there is no need for maintaining separate public keys in addition to the link identifiers. The sender device 304 is required to know only the link identifiers (which can be learnt as part of the source routing protocol) and does not require from the receiver device 306 any additional information. Also, the aspects of the present disclosure allow the receiver device 306 to verify that a packet was forwarded through the correct path, without having any knowledge about that path. As a result, privacy of the sender device 304 and the associated sender is protected. If a path involves multiple receiver devices, then each receiver device can autonomously decide about the packet it received. Also, the present disclosure allows for the protection of multipath/multisource delivery paths. The aspects of the present disclosure can also be used for detecting malfunctioning and/or malicious programmable switch devices.

According to an aspect of the present disclosure, the identity-based encryption algorithm is based on bilinear groups and maps. A map is a function that maps two elements belonging to two cyclic groups G1 and G2, of prime order p, into an element of another group Gt. In an example, the groups G1 and G2 may be same, and they may be elements of a pairing friendly elliptic curve. The groups Gl and G2 may collectively be referred to as G. In an aspect, all cryptographic operations have as input and outputs, numbers that are elements of G, or elements of Gt, or elements of Zp (where p is the order of G). For this reason, there may be three hash functions that may be considered, namely h1, h2, and h3. In an example, h1 may map any bitstring to an element of G, h2 may map any bitstring to an element of Gt, and h3 may map any bitstring to an element of Zp.

As described above, the SDN controller 202 is configured to generate secret keys for the plurality of programmable switch devices 106-(1-N) based on the identity-based encryption algorithm. The identity-based encryption algorithm requires as input an element of Zp. For this reason, the SDN controller 202 may use h3 (link ID) as an input to this identity-based encryption algorithm. Further, at any time the sender device 304 wishes to create an authenticator, the sender device 304 may select at random an element of the group Gt to hold the role of the nonce n. The first cipthertext $C_m = \text{Enc}_{IDm}(n)$ is constructed using identity-based encryption algorithm. The identity-based encryption algorithm has the plaintext, the target identifier, and a random numbers s as inputs. The generated ciphertext is composed of three numbers. Accordingly, the ciphertext is denoted as the triple C={A, B, C}. C{A} is an element of Gt, whereas elements C{B, C} are elements of G. Ciphertext $C_{m-1}$ is constructed as follows. The sender device 304 applies the identity-based encryption algorithm using $C_m\{A\}$, the same target identifier, and the same random number s as inputs. Therefore $C_{m-1} = \{\text{Enc}_{IDm-1}(C_m\{A\}, B, C'\}$, where $C_{m-1}\{B\} = C_m\{B\}$ and $C_{m-1}\{C'\}C_m\{C\}$. This process continues until the sender device 304 generates $C_1$ which is the authenticator of the selected path.

According to aspects of the present disclosure, whenever a programmable switch device requests a new secret key, the programmable switch device will receive a new link ID. Accordingly, the SDN controller 202 does not re-use the same link ID to generate the new secret key. From the network perspective this appears as a link has gone down and a new one has apparated, therefore this change can be handled by an underlying topology management protocol.

Examples and Experiments

The following examples are provided to illustrate further and to facilitate the understanding of the present disclosure.

Experimental Data and Analysis

The size of the various cryptographic components depends on the used group G (which also affects Gt). In an example, let Sg be the size in bits of an element of G, and Sgt the size in bits of an element in Gt. Table 1 provided below presents the size of some key components of construction.

TABLE 1

| Component | Size |
|---|---|
| System Parameter | 3Sg + Sgt |
| Secret key | 2Sg |
| Cid | 2Sg + Sgt |

For the type A elliptic curve of a pairing-based cryptography (PBC) library, Sg=512 bits and Sgt=1024 bits. For the same type of curve, table 2 (provided below) reports the time required to perform the basic cryptographic operations in an Ubuntu 20.4 machine with 4 GB of Random Access Memory (RAM) and an Intel i5 processor*.

TABLE 2

| Operation | Time in ms |
|---|---|
| Master key and system parameter generation | 19 |
| Secret key generation | 3.8 |
| Encryption | 3.9 |
| Decryption | 4.7 |

Figure 10:
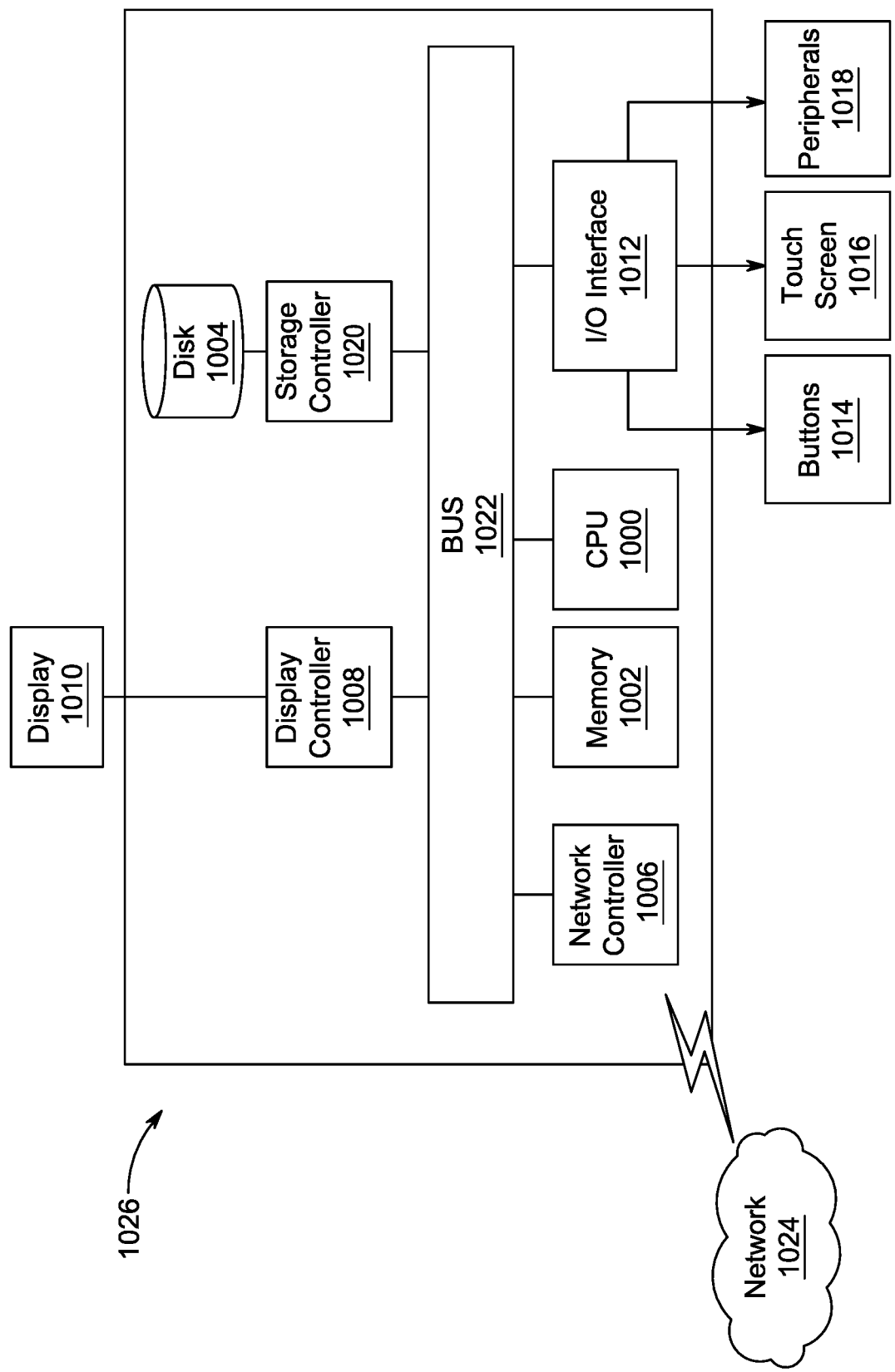
FIG. 10 is a diagram of a general purpose computer for implementing the communication system, according to aspects of the present disclosure.

Next, further details of the hardware description of the computing environment according to exemplary embodiments is described with reference to FIG. 10. FIG. 10 is a diagram of a general purpose computer 1026 for implementing the communication system 302, according to aspects of the present disclosure.

The computer 1026 includes a CPU 1000 which performs the processes described herein. The process data and instructions may be stored in memory 1002. These processes and instructions may also be stored on a storage medium disk 1004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1026 communicates, such as a server or computer.

Further, one or more embodiments may be provided as a utility application, background daemon, or component of an operating system, or combination thereof, executing in conjunction with CPU 1000 and an operating system such as Microsoft® Windows®, UNIX®, Oracle® Solaris, LINUX®, Apple macOS® and other systems known to those skilled in the art.

In order to achieve the computer 1026, the hardware elements may be realized by various circuitry elements, known to those skilled in the art. For example, CPU 1000 may be a Xenon® or Core® processor from Intel Corporation of America or an Opteron® processor from AMD of America, or may be other processor types that would be recognized by one of ordinary skill in the art. Alternatively, the CPU 1000 may be implemented on an FPGA, ASIC, PLD or using discrete logic circuits, as one of ordinary skill in the art would recognize. Further, CPU 1000 may be implemented as multiple processors cooperatively working in parallel to perform the instructions of the inventive processes described above.

The computer 1026 in FIG. 10 may also include a network controller 1006, such as an Intel Ethernet PRO network interface card from Intel Corporation of America, for interfacing with network 1024. As can be appreciated, the network 1024 can be a public network, such as the Internet, or a private network such as LAN or WAN network, or any combination thereof and can also include PSTN or ISDN sub-networks. The network 1024 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 1026 further includes a display controller 1008, such as a NVIDIA® GeForce® GTX or Quadro® graphics adaptor from NVIDIA Corporation of America for interfacing with display 1010, such as a Hewlett Packard® HPL2445w LCD monitor. A general purpose I/O interface 1012 interfaces with a keyboard and/or mouse 1014 as well as an optional touch screen panel 1316 on or separate from display 1310. General purpose I/O interface also connects to a variety of peripherals 1018 including printers and scanners, such as an OfficeJet® or DeskJet® from Hewlett Packard®.

The general purpose storage controller 1020 connects the storage medium disk 1004 with communication bus 1022, which may be an ISA, EISA, VESA, PCI, or similar, for interconnecting all of the components of the computer 1026. A description of the general features and functionality of the display 1010, keyboard and/or mouse 1014, as well as the display controller 1008, storage controller 1020, network controller 1006, and general purpose I/O interface 1012 is omitted herein for brevity as these features are known.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Software-Defined Networking (SDN) is widely used by the industry, especially for intra-domain traffic engineering. The disclosed SDN method can be used for securing networks that offer source-routing services. Additionally, the disclosed SDN method can be used for providing add-on security to SDN networks. The disclosed SDN method can be implemented in software-based programmable switches. Finally, the disclosed SDN method can be used in SDN architectures composed of unreliable nodes.

Intra-domain traffic engineering Traffic Engineering (TE) may utilize SDN, for example, in the measurement and management of network traffic, and in the design of reasonable routing mechanisms to guide network traffic to improve utilization of network resources and meet requirements of the quality of service of the network. Traffic measurement can study how to monitor, measure and acquire network status information in an SDN system. Measurement of network parameters can be performed by the SDN controller detecting current network topology. The network status information can include current topology connection status and status of ports.

Source-Routing Services

An application of source-routing is discussed in Godfrey, P. Brighten, Igor Ganichev, Scott Shenker, and Ion Stoica. "Pathlet routing." ACM SIGCOMM Computer Communication Review 39, no. 4 (2009): 111-122. herein incorporated by reference in its entirety. Pathlet routing can emulate the policies of source routing and several multipath proposals. The flexibility of pathlet routing are used to address two major challenges for Internet routing: scalability and source-controlled routing. The disclosed SDN method can be used for securing the source-controlled routing.

SDN can be used in large-scale testbeds, as described in Berman, M., Chase, J. S., Landweber, L., Nakao, A., Ott, M., Raychaudhuri, D., Ricci, R. and Seskar, I, 2014. GENI: A federated testbed for innovative network experiments. Computer Networks, 61, pp. 5-23, herein incorporated by reference in its entirety. GENI, the Global Environment for Networking Innovation, is a distributed virtual laboratory for transformative, at-scale experiments in network science, services, and security.

Source-routing services may be offered as commercial products, Avaya Converged Network Analyzer, available at: support.avaya.com/products/P0381/converged-network-analyzer, herein incorporated by reference in its entirety. The Avaya Converged Network Analyzer solution family offers enterprises a set of tools that can monitor the IP network and provide IT personnel with detailed reports and analysis of application performance, and can take corrective action to reroute critical application traffic should IP network blackouts or brownouts occur. The disclosed SDN method can be used for securing the rerouting of critical application traffic.

Tools for Building Custom SDN Networks

There are several tools for building custom SDN networks, particularly in the context of 5G, e.g., Ericsson, Nokia, and Huawei. Ericsson Cloud Execution Environment is a virtual infrastructure manager (VIM) certified on OpenStack and OpenNFV. Deployed in the NFVI solution, it dynamically allocates resources for VNFs with capabilities such as redundancy, high availability, high throughput with low latency, trusted tenant isolation, automatic virtual machine recovery. Nokia's Nuage Networks Virtualized Cloud Services (VCS) is a Software-Defined Networking (SDN) solution that provides network virtualization and advanced automation across cloud data center infrastructures. See Ericsson Cloud SDN, www.ericsson.com/en/portfolio/digital-services/cloud-infrastructure/cloud-sdn; Nokia Cloud SDN, www.nokia.com/networks/portfolio/cloud-sdn-nfv-and-cloud-native/; Huawei Cloud Engine, e.huawei.com/my/products/network-management-and-analysis-software, herein incorporated by reference in their entirety.

Before the introduction of SDN, networks were manually configured through the use of command lines, which is an inefficient, error-prone, and expensive process. SDN introduces great changes to traditional command line deployment, with many manufacturers providing intuitive Graphical User Interfaces (GUIs). SDN integrates with VXLAN overlay technology to associate virtual Network Elements (NEs) with compute resources after network virtualization, providing service-oriented networks and removing the need for tedious configuration. The disclosed SDN method can be used for providing add-on security to the tools.

Software-Based Programmable Switches

There is a number of software-based programmable switch products, including Open vSwitch. See Open vSwitch homepage, www.openvswitch.org, herein incorporated by reference in its entirety. Open vSwitch is widely used, and can be installed in any linux-based workstation, as well as in smaller devices such as in Raspberry Pis, and linux-based operating systems for routers. See dd-wrt homepage, https_dd-wrt.com; OpenWrt Project, openwrt.org/, herein incorporated by reference in their entirety. DD-WRT is a Linux based alternative OpenSource firmware suitable for a great variety of WLAN routers and embedded systems. The disclosed SDN method can be implemented in these software-based programmable switches.

SDN Architectures Composed of Unreliable Nodes

The disclosed SDN source routing method can be used in SDN architectures composed of unreliable nodes. Emerging SDN architectures include unconventional networks, such as Vehicular networks, Mobile ad-hoc networks, or the Internet of Things. See Duan, X., Liu, Y. and Wang, X., 2017. SDN enabled 5G-VANET: Adaptive vehicle clustering and beamformed transmission for aggregated traffic. IEEE Communications Magazine, 55(7), pp. 1120-127; Poularakis, K., Iosifidis, G. and Tassiulas, L., 2018. SDN-enabled tactical ad hoc networks: Extending programmable control to the edge. IEEE Communications Magazine, 56(7), pp. 132-138; Ojo, M., Adami, D. and Giordano, S., 2016, December. A SDN-IoT architecture with NFV implementation. In 2016 IEEE Globecom Workshops (GC Wkshps) (pp. 1-6). IEEE, herein incorporated by reference in their entirety.

In order to support the increasing traffic and improve Het-Net management, Duan describes an SDN enabled 5G VANET, where neighboring vehicles are clustered adaptively according to real-time road conditions using SDN's global information gathering and network control capabilities.

Poularakis describes a set of novel architecture designs for SDN-enabled mobile ad hoc networks in the tactical field. Modern tactical operations have complex communication and computing requirements, often involving different coalition teams, that cannot be supported by today's mobile ad-hoc networks. To this end, the emerging software defined networking (SDN) paradigm can enable the redesign and successful deployment of these systems.

The Internet of things (IoT) describes the network of physical objects, so known as, "things" that are embedded with sensors, software, and other technologies that is used for the purpose of connecting and exchanging data with other devices and systems over the Internet. Ojo describes a simple and general SDN-IoT architecture with Network functions virtualization (NFV) implementation with specific choices on where and how to adopt SDN and NFV approaches to address the new challenges of the Internet of Things. An Internet of Things architecture can include objects, such as sensory objects and appliances, that are connected to a network layer through a gateway.

Numerous modifications and variations of the present disclosure are possible in light of the above teachings. It is therefore to be understood that within the scope of the appended claims, the invention may be practiced otherwise than as specifically described herein.

The invention claimed is:

1. A mobile device network that routes packets, the network comprising:
    a plurality of programmable switch devices in the network that dynamically make packet switching decisions for routing the packets;
    a network controller for configuring the switch devices;
    a sender device in a first mobile device connected in the network; and
    a receiver device in a second mobile device connected in the network,
    wherein the sender device selects a path including links to predefined switch devices of the plurality of switch devices in the network that a packet will follow, wherein the packet contains an authenticator,
    wherein every said predefined switch device that forwards the packet performs a computation that alters the authenticator based on an identity-based encryption algorithm, and
    wherein the receiver device verifies that the packet was forwarded through the selected path based on a final value of the authenticator resulting from the computation performed by a last switch device that forwards the packet to the receiver.

2. The mobile device network of claim 1, wherein each predefined switch device is configured to detect if the packet is received from a link that is not included in the selected path.

3. The mobile device network of claim 1, wherein the sender device is configured to construct the authenticator by encrypting a nonce with m layers of encryption, where m is a number of links in the selected path.

4. The mobile device network of claim 3, wherein, in accordance with the identity-based encryption algorithm, each link of the selected path is assigned a link ID,
    wherein the sender device generates a nonce, in which starting from a final link of the selected path, the sender device encrypts the nonce using the link ID of the final link, then repeatedly encrypts the encrypted nonce using each preceding link back through the links of the selected path to an initial link.

5. The mobile device network of claim 1, wherein the sender device is configured to insert the authenticator into a header of the packet.

6. The mobile device network of claim 4, wherein each programmable switch device decrypts the authenticator using the link ID of a next link in the selected path,
    wherein when the decryption succeeds the respective programmable switch device forwards the packet including the altered authenticator, and
    wherein when the decryption fails, the packet is rejected as being in a wrong programmable switch device.

7. The mobile device network of claim 4, wherein the receiver device is configured to decrypt the encrypted nonce and check that a nonce is the encrypted nonce in order to verify that the packet was forwarded through the selected path.

8. The mobile device network of claim 4, wherein each programmable switch device decrypts the authenticator using a secret key that corresponds to a link ID of a next link in the selected path, and whenever a programmable switch device requests a new secret key, the programmable switch device will receive a new link ID.

9. The mobile device network of claim 8, wherein the network controller is configured to generate a master secret key that is kept secret in a secure memory, wherein the network controller is configured to generate the secret key based on the master secret key and at least one system parameter.

10. The mobile device network of claim 1, wherein the path includes a branch to two or more branched paths,
   wherein the sender device is configured to
   construct a branch authenticator for each branched path, and
   create a merged authenticator that merges the branched paths into a single link; and
   wherein a programmable switch device at the branch is configured to
   split the merged authenticator into a plurality of authenticator parts,
   decrypt each of the authenticator parts, and
   forward one of the authenticator parts to the branched path in which the decryption is successful.

11. An appliance network for routing of packets, the network comprising:
   at least one stationary appliance comprising a communications device, the at least one stationary appliance connected in the network;
   at least one interface computer device comprising a communications device, the at least one interface computer device connected in the network;
   a plurality of programmable switch devices in the network that dynamically make packet switching decisions for routing the packets;
   a network controller for configuring the switch devices;
   a sender device in an interface computing device of the at least one interface computer device; and
   a receiver device in a stationary appliance of the at least one stationary appliance,
   wherein the sender device selects a path including links to predefined switch devices of the plurality of switch devices in the network that a packet will follow, wherein the packet contains an authenticator,
   wherein every said predefined switch device that forwards the packet performs a computation that alters the authenticator based on an identity-based encryption algorithm, and
   wherein the receiver device verifies that the packet was forwarded through the selected path based on a final value of the authenticator resulting from the computation performed by a last switch device that forwards the packet to the receiver.

12. The appliance network of claim 1, wherein each predefined switch device is configured to detect if the packet is received from a link that is not included in the selected path.

13. The appliance network of claim 1, wherein the sender device is configured to construct the authenticator by encrypting a nonce with m layers of encryption, where m is a number of links in the selected path.

14. The appliance network of claim 3, wherein, in accordance with the identity-based encryption algorithm, each link of the selected path is assigned a link ID,
   wherein the sender device generates a nonce, in which starting from a final link of the selected path, the sender device encrypts the nonce using the link ID of the final link, then repeatedly encrypts the encrypted nonce using each preceding link back through the links of the selected path to an initial link.

15. The appliance network of claim 1, wherein the sender device is configured to insert the authenticator into a header of the packet.

16. The appliance network of claim 4, wherein each programmable switch device decrypts the authenticator using the link ID of a next link in the selected path,
   wherein when the decryption succeeds the respective programmable switch device forwards the packet including the altered authenticator, and
   wherein when the decryption fails, the packet is rejected as being in a wrong programmable switch device.

17. The appliance network of claim 4, wherein the receiver device is configured to decrypt the encrypted nonce and check that a nonce is the encrypted nonce in order to verify that the packet was forwarded through the selected path.

18. The appliance network of claim 4, wherein each programmable switch device decrypts the authenticator using a secret key that corresponds to a link ID of a next link in the selected path, and whenever a programmable switch device requests a new secret key, the programmable switch device will receive a new link ID.

19. The appliance network of claim 8, wherein the network controller is configured to generate a master secret key that is kept secret in a secure memory, wherein the network controller is configured to generate the secret key based on the master secret key and at least one system parameter.

20. The appliance network of claim 1, wherein the path includes a branch to two or more branched paths,
   wherein the sender device is configured to
   construct a branch authenticator for each branched path, and
   create a merged authenticator that merges the branched paths into a single link; and
   wherein a programmable switch device at the branch is configured to
   split the merged authenticator into a plurality of authenticator parts,
   decrypt each of the authenticator parts, and
   forward one of the authenticator parts to the branched path in which the decryption is successful.

* * * * *